(12) United States Patent
Waldl

(10) Patent No.: US 10,937,145 B2
(45) Date of Patent: Mar. 2, 2021

(54) CAMERA CORE OF A SMART CAMERA FOR INDUSTRIAL IMAGE PROCESSING AND METHOD FOR INDUSTRIAL IMAGE PROCESSING

(71) Applicant: B&R INDUSTRIAL AUTOMATION GMBH, Eggelsberg (AT)

(72) Inventor: Andreas Waldl, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 16/292,842

(22) Filed: Mar. 5, 2019

(65) Prior Publication Data

US 2019/0279355 A1   Sep. 12, 2019

(30) Foreign Application Priority Data

Mar. 6, 2018 (EP) ..................................... 18160253

(51) Int. Cl.
 *G06T 7/00* (2017.01)
 *H04N 5/225* (2006.01)
 *H04N 5/232* (2006.01)

(52) U.S. Cl.
 CPC ......... *G06T 7/0004* (2013.01); *H04N 5/2256* (2013.01); *H04N 5/23203* (2013.01); *H04N 5/23222* (2013.01); *G06T 2200/28* (2013.01)

(58) Field of Classification Search
 CPC . G06T 2200/28; G06T 7/0004; H04N 5/2256; H04N 5/23203; H04N 5/23222
 See application file for complete search history.

(56) References Cited

U.S. PATENT DOCUMENTS

| 7,327,396 | B2 * | 2/2008 | Schultz | .................. | H04N 5/225 |
| | | | | | 348/207.1 |
| 8,794,521 | B2 | 8/2014 | Joussen et al. | | |
| 2003/0193571 | A1 * | 10/2003 | Schultz | .................. | H04N 5/225 |
| | | | | | 348/207.99 |
| 2006/0088196 | A1 | 4/2006 | Popovich et al. | | |
| 2007/0201864 | A1 * | 8/2007 | Shinkai | ................ | G11B 27/034 |
| | | | | | 396/429 |

(Continued)

FOREIGN PATENT DOCUMENTS

| DE | 10 2009 009 533 | 8/2010 |
| DE | 10 2016 121 088 | 5/2017 |
| WO | 2016/169667 | 10/2016 |

OTHER PUBLICATIONS

Europe Search Report & Office Action conducted in counterpart Europe Appln. No. 18160253.3-1209 (dated Aug. 30, 2018).

*Primary Examiner* — Amy R Hsu
(74) *Attorney, Agent, or Firm* — Greenblum & Bernstein, P.L.C.

(57) ABSTRACT

To produce a real-time smart camera that can be flexibly configured in terms of hardware, a camera core is provided. The camera core is designed as a hardware arithmetic logic unit, and a real-time data bus interface, for connecting a real-time data bus, and a camera control unit are additionally provided in the camera core. The camera control unit is connected to both the real-time data bus interface and the image sensor interface, and the camera control unit is actuated via the real-time data bus interface to prompt the capture of an image. The camera control unit controls the image sensor interface.

20 Claims, 2 Drawing Sheets

(56) References Cited

U.S. PATENT DOCUMENTS

| | | | |
|---|---|---|---|
| 2009/0027509 A1* | 1/2009 | Giesen | H04N 5/232 348/211.3 |
| 2010/0123726 A1* | 5/2010 | Ito | G06T 11/60 345/501 |
| 2014/0055467 A1* | 2/2014 | Bittner | G06T 1/60 345/520 |
| 2015/0355103 A1* | 12/2015 | Ando | G01N 21/8806 348/46 |
| 2016/0234404 A1* | 8/2016 | Kishi | H04N 5/23203 |
| 2017/0199542 A1* | 7/2017 | Sylvester | G06T 1/20 |
| 2018/0136142 A1 | 5/2018 | Will et al. | |

\* cited by examiner

CAMERA CORE OF A SMART CAMERA FOR INDUSTRIAL IMAGE PROCESSING AND METHOD FOR INDUSTRIAL IMAGE PROCESSING

CROSS-REFERENCE TO RELATED APPLICATIONS

The present application claims priority under 35 U.S.C. § 119(a) of Europe Patent Application No. 181 60 253.3 filed Mar. 6, 2018, the disclosure of which is expressly incorporated by reference herein in its entirety.

BACKGROUND OF THE INVENTION

1. Field of the Invention

The present invention relates to a camera core of a smart camera for industrial image processing, comprising an image sensor interface for connecting an image sensor for capturing an image. The invention also relates to a smart camera comprising a camera core of this kind, and to a method for the industrial image processing of image data captured by an image sensor of a smart camera.

2. Discussion of Background Information

"Smart cameras" are used in industrial image processing. They are distinguished on account of the fact that they can be used to not only capture images, but also to process them further. The further processing may involve pre-processing of the captured image data, for example filtering or preparation or correction of the image data, for example to compensate for imaging errors, and/or analysis of the (possibly preprocessed) image data, for example to acquire measured values or determine the location/position/orientation of an object. A smart camera thus does not deliver raw image data to an interface, but rather it delivers either image data processed in a particular manner into an output signal or prepared image data. However, it goes without saying that the smart camera can additionally transmit the raw image data.

Since this kind of image processing is usually very complex in computing terms and/or high capturing rates are often desired or required, it is already known to use a hardware arithmetic logic unit (an FPGA (field-programmable gate array), an ASIC (application-specific integrated circuit), a CPLD (complex programmable logic device) or the like) and a software arithmetic logic unit in a smart camera to process the image data. An example of this can be found in DE 10 2009 009 533 B4 or U.S. Pat. No. 8,794,521 B2. The captured image data are pre-processed in the hardware arithmetic logic unit. The pre-processed image data are then processed further in the software arithmetic logic unit to form an output variable, which the software arithmetic logic unit outputs to the smart camera as an output signal. By way of example, the output variable is used to control a machine or system in which industrial image processing is used. In DE 10 2009 009 533 B4 or U.S. Pat. No. 8,794,521 B2, the software arithmetic logic unit takes on the control of all the components of the smart camera, in particular the image detector and the hardware arithmetic logic unit. In addition, a communications controller, which provides the data interface with the outside world, is coupled to, and controlled by, the software arithmetic logic unit.

In many applications, however, it is necessary to incorporate the smart camera in a real-time system. This means, in particular, that the smart camera has to capture the image in a predefined real-time step in a synchronous and deterministic manner and with as little jitter as possible, typically of less than 1 μs. If the smart camera did not adhere to these real-time requirements within a real-time system, this would prompt an error message and, in some circumstances, would stop the entire system in which the smart camera is incorporated. Synchronicity is also a requirement for data exchange between a plurality of real-time components, as may be required, in highly dynamic machines or systems for example, between a programmable logic controller (PLC), drive components of the machine or system and a smart camera, for example.

A basic requirement for data exchange between a plurality of real-time components is, firstly, a real-time data bus (fieldbus) or a time-sensitive network (TSN), over which the data are exchanged and which enables synchronicity, for example via either the precision time protocol (PTP) specified in IEEE 1588 or the communication protocol. In addition, full integration of a plurality of real-time components enables a uniform database by which each individual real-time component can synchronously control and influence data and events of another real-time component.

Usually, a software arithmetic logic unit is interrupt-controlled by the connected components. This means that a component connected to the software arithmetic logic unit indicates an interrupt on an interrupt line to prompt the execution of certain program parts in the software arithmetic logic unit. Due to existing interrupt latency times, but also the required prioritisation of the software execution in the software arithmetic logic unit, it may be difficult to meet tough real-time requirements when using a smart camera according to DE 10 2009 009 533 B4, for example because the communications controller described therein is directly connected to the software arithmetic logic unit or because the capture of an image is triggered by the software arithmetic logic unit.

In document DE 10 2016 121088 A1 the prompt to capture an image is controlled by a closed-loop capturing controller on the basis of object movement data communicated in the network by a closed-loop movement controller. For this purpose, in the closed-loop capturing controller, a virtual axis application is provided in the software arithmetic logic unit, by which application the movement of the object is simulated in order to prompt an image. The capture of an image is thus prompted by a closed-loop capturing controller that communicates with a closed-loop movement controller over a network. To do so, the virtual axis application requires additional arithmetic resources. It is apparent to a person skilled in the art that even when using a deterministic network, such as POWERLINK as in DE 10 2016 121088 A1, and/or when the clocks of the controllers are synchronised by way of the IEEE 1588 standard, it would be difficult to adhere to tough real-time requirements, specifically because of the latency times occurring in the communication due to the cascade controllers. In addition, the required additional arithmetic resources also affect the real-time capabilities.

In these known smart camera hardware concepts, the hardware design is not easy to alter either, since the software arithmetic logic unit is central for the smart camera and it controls the prompt for the image sensor to capture an image via a hardware arithmetic logic unit arranged in between. Therefore, these smart camera components have to be adapted to one another and to the application, meaning that they cannot simply be swapped. The configuration of the smart camera according to the prior art is thus fixed.

SUMMARY OF THE EMBODIMENTS

Embodiments of the present invention provide a real-time smart camera that can be flexibly configured in hardware terms, and also an industrial image processing method carried out by said camera.

According to the invention, the camera core is designed as a hardware arithmetic logic unit, and a real-time data bus interface, for connecting a real-time data bus, and a camera control unit are additionally provided in the camera core, the camera control unit being connected to both the real-time data bus interface and the image sensor interface, and the camera control unit is actuated via the real-time data bus interface to prompt the capture of an image, the camera control unit controlling the image sensor interface. The method according to the invention provides, via an image sensor interface of a camera core of the smart camera, the image sensor is connected to a camera control unit of the camera core, and the camera control unit is connected to a real-time data bus interface of the camera core, the camera control unit controlling the prompt for the image sensor to capture an image when a synchronisation data packet is received via a real-time data bus connected to the real-time data bus interface.

This design allows the image sensor to be prompted in real-time to capture an image because, via the camera control unit, the image sensor interface is closely connected to the real-time data bus interface and a real-time data bus connected thereto. In addition, the camera core can be flexibly connected to various image sensors in order to adapt the smart camera to the requirements.

Advantageously, a data interface for connecting a software arithmetic logic unit is provided in the hardware arithmetic logic unit, the data interface being connected to the camera control unit, and the camera control unit controlling the data interface. Via the data interface, various software arithmetic logic units can be connected, as a result of which the camera core can be flexibly expanded and scaled in order to flexibly adapt the smart camera to the requirements.

In an advantageous embodiment, a data bus interface for connecting a non-real-time data bus is provided in the hardware arithmetic logic unit, the data bus interface being connected to the camera control unit, and the camera control unit controlling the data bus interface. Via the non-real-time data bus, either the result of processing the captured image data, e.g. in the form of an output signal, or image data themselves can be transmitted. In addition, the data bus interface can also be used to configure the camera core or components thereof, or to load programs into a possibly connected software arithmetic logic unit, without placing strain on the real-time data bus.

Advantageously, an illumination interface for connecting an illumination unit controlled by the camera control unit is provided in the hardware arithmetic logic unit. This allows the illumination to be synchronised with the real-time prompt to capture an image.

External components of the smart camera can be synchronised in a simple manner if an I/O interface controlled by the camera control unit is provided in the hardware arithmetic logic unit.

To allow the input image data to be pre-processed more quickly in the camera control unit, an image processing unit for processing image data can be provided in the hardware arithmetic logic unit and/or the camera control unit itself can be provided for processing image data.

Preferably, the smart camera is prompted to capture an image and/or the illumination unit is activated when the camera control unit receives a synchronisation data packet via a real-time data bus connected to the real-time data bus interface, or when the camera control unit receives a trigger signal via a trigger input connected to the I/O interface.

To expand the options for processing the image data, a software arithmetic logic unit that receives and processes image data from the camera core can be connected to the data interface.

BRIEF DESCRIPTION OF THE DRAWINGS

The present invention will now be explained in More detail with reference to FIG. 1 to 4, which show example, schematic, non-limiting, advantageous embodiments of the invention and in which.

DETAILED DESCRIPTION OF THE EMBODIMENTS

Figure 1:
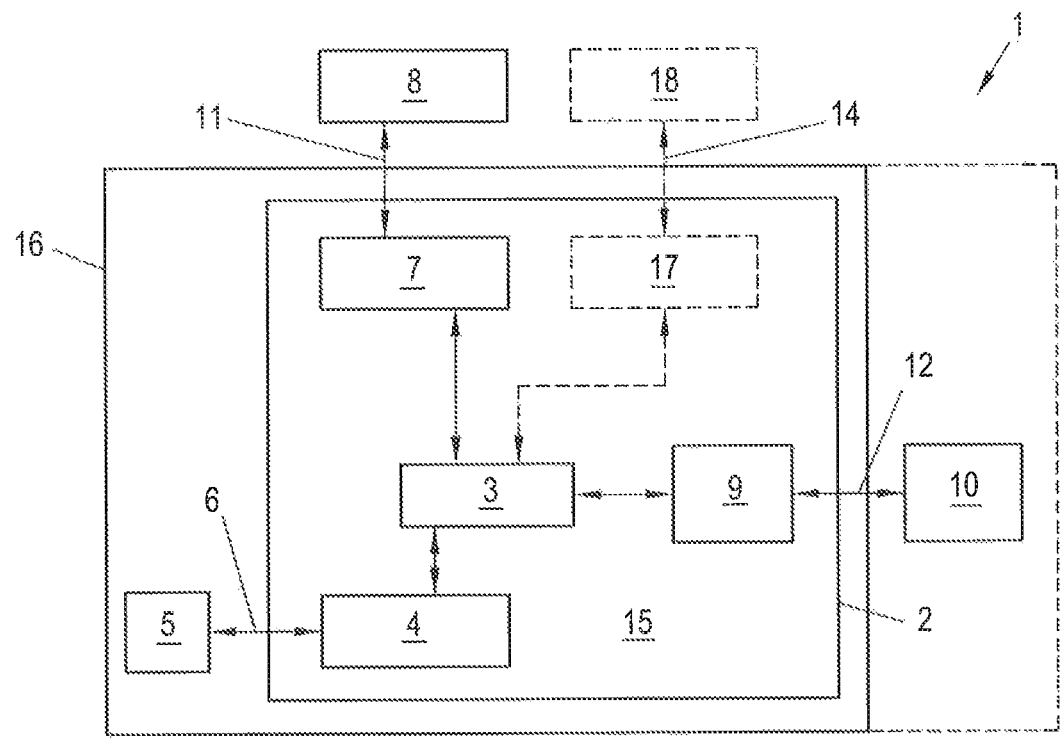
FIG. 1 shows a smart camera according to the invention comprising a camera core.

Via FIG. 1, the essential components of a smart camera 1 according to the invention are described. In the centre of the smart camera 1 is the camera core 15 according to the invention, which is designed as a hardware arithmetic logic unit 2. The hardware arithmetic logic unit 2 is, for example, an FPGA, ASIC or CPLD module, i.e. an integrated electronic circuit in which the necessary functions are implemented in hardware. In this respect, "implemented in hardware" means that the required functions are implemented by a digital circuit. In the embodiment shown, the hardware arithmetic logic unit 2 comprises an image sensor interface 4, a real-time data bus interface 7, a data interface 9 and a camera control unit 3.

An image sensor 5 for digitally capturing an image can be connected to the image sensor interface 4 via a sensor line 6. The image sensor line 6 can comprise an image sensor data line and an image sensor control line for configuring the image sensor 5 and triggering the capture of an image. Via the sensor line 6, the image data are transmitted from the image sensor 5 to the image sensor interface 4 of the camera core 15. Additional configuration lines in the image sensor line 6 can, as required, set or adjust the settings of additional components important for imaging that may be present, such as the focus (also in form of an autofocus) and the diaphragm of an optics of the image sensor 5. To transmit the image data, a sufficiently fast image sensor line 6 is of course preferably provided, for example a broadband data interface.

A real-time data bus 11 can be connected to the real-time data bus interface 7. The camera core 15, or the smart camera 1, can thus be incorporated in a real-time system. For example, the smart camera 1 can thus be connected to an external control unit 8 that integrates the smart camera 1 in the real-time control of a machine or system. There is a huge range of real-time data buses, in particular Ethernet-based fieldbuses, such as POWERLINK, EtherNet/IP, Profinet and SERCOS III, that can be used here. The real-time data bus interface 7 can also be implemented for various known communication protocols, such as CANopen, OPC UA and openSAFETY. For industrial applications, data buses are often deemed real-time data buses when they ensure bus cycles of less than 1 ms; in each bus cycle, data can be transmitted according to the implemented communication protocol. For example, using POWERLINK it is possible to ensure bus cycles in the range of 100 µs having a jitter of less than 1 µs.

A software arithmetic logic unit 10 can be connected to the data interface 9 via a data bus 12. However, a software arithmetic logic unit 10 need not necessarily be provided in the smart camera 1. By way of example, the software arithmetic logic unit 10 is a microprocessor, a DSP (digital signal processor), a computer or the like. The software arithmetic logic unit 10 is distinguished in that it obtains its functionality by way of programming that is loaded into the software arithmetic logic unit 10, for example. The required programs are executed on the software arithmetic logic unit 10. In doing so, the requirements on the data interface 9 are isolated from real-time capabilities of the smart camera 1 since the real-time-critical image capturing need not be prompted via said data interface 9. The bandwidth of the data interface 9 is only critical for the overall performance of the smart camera 1 if the image data are processed on the software arithmetic logic unit 10, and so an LVDS (low-voltage digital signaling) interface, such as a PCIe (peripheral component connected express) bus of various generations (currently PCIe V4.0), or an MIPI (mobile industry processor interface alliance) camera serial interface, or any other suitable high-performance data interface can be used as the data interface 9.

Additionally, a camera control unit 3 that controls the image sensor interface 4, the real-time data bus interface 7 and the data interface 9 is implemented in the camera core 15. In this context, "controls" means that the camera control unit 3 prompts the image sensor 5 to capture an image and prompts the inputting of image data via the image sensor interface 4, controls the real-time data communications via the real-time data bus 11 and the real-time data bus interface 7, and optionally also controls the data communications with the software arithmetic logic unit 10 via the data interface 12. Due to the camera core 15 being designed as a hardware arithmetic logic unit 2, the individual components subject to real-time requirements, in particular the image sensor interface 4 and the real-time data bus interface 7, can carry out their functions concurrently and substantially independently of one another. Other components not necessarily subject to real-time requirements, e.g. the data interface 9, can also be executed concurrently. As a result, there cannot be any time delays, e.g. interrupt latency times or software prioritisation. These time-critical functions are thus controlled directly by the hardware arithmetic logic unit 2 and can therefore be executed very quickly, which in principle gives the camera core 15 real-time capabilities, especially since all the components required for synchronising the image-capture prompt can also be connected to other real-time components via the real-time data bus interface 7. Therefore, the prompt for the image sensor 5 to capture an image is integrated in the real-time system and can be carried out in real time.

In the camera control unit 3, the image data input by the image sensor 5 can also be pre-processed before the image data are stored or supplied for further processing in the smart camera 1, e.g. in the software arithmetic logic unit 10. In simple applications, the input image data can also be processed in full in the camera control unit 3, whereby it may be possible in some circumstances to also forgo a software arithmetic logic unit 10, in a simple implementation of the camera core 15, therefore, the data interface 9 can also be forgone.

Figure 3:
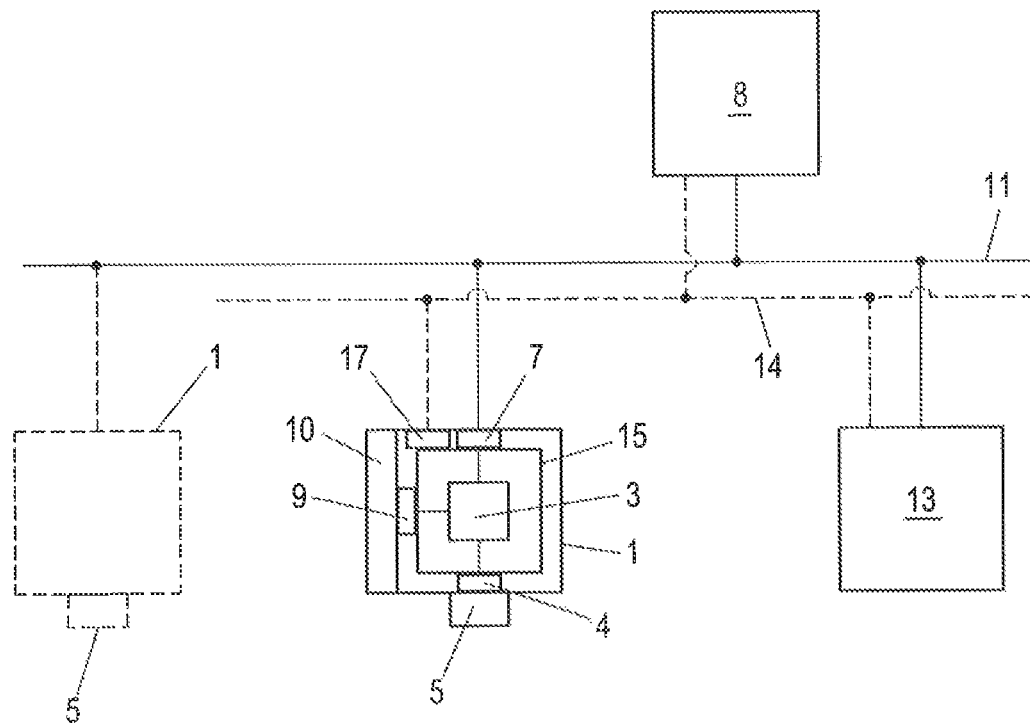
FIGS. 3 and 4 show the incorporation of a smart camera in a control assembly comprising industrial image processing.

In addition, a data bus interface 17 can also be implemented in the camera core 15 in order to connect the camera core 15, or the smart camera 1, to a non-real-time data bus 14, as shown in a dashed line in FIG. 8. The data bus interface 17 is preferably controlled by the camera control unit 3. The data bus 14 can, for example, be an Ethernet bus having TCP/IP as the communication protocol. The camera core 15, or the smart camera 1, can thus also be connected to other components 18, for example of a machine or system, that do not need to comply with any real-time requirement. It goes without saying that a control unit 8, or another network component, having an interface for the non-real-time data bus 14 and an interface for the real-time data bus 11 could also be provided, in which case said unit or component can be connected to both the data bus interface 17 and the real-time data bus interface 7 (e.g. as shown in FIG. 3). By way of example, the result of the image processing in the smart camera 1 can also be output via the non-real-time data bus 14.

However, this basic architecture of the smart camera 1 is also advantageous in that various components can be connected to the camera core 15 via its interfaces (image sensor interface 4, real-time data bus interface 7, optionally a data interface 9 and optionally also a data bus interface 17), thereby enabling a particularly flexible configuration of the smart camera 1. By way of example, the image sensor 5 can be arranged in a camera housing 16 together with the camera core 15, as in FIG. 1. Likewise, however, an external image sensor 5 could also be connected to the camera core 15 in the camera housing 16 via the image sensor interface 4. As a result, various image sensors 5, or one image sensor 5 having various optics, can be used together with same camera core 15. In the same way, the software arithmetic logic unit 10 can be arranged in the camera housing 16, as shown in dashed lines in FIG. 1. However, an external software arithmetic logic unit 10 can also be connected to the camera core 15 via the data interface 12. In this way, for example, a more powerful processor can be used, or the camera core 15 can also be connected to an (industrial) PC acting as the software arithmetic logic unit 10. In addition to the options for the real-time data bus 11, this also provides a series of options for configuring a real-time smart camera 1.

When using an (industrial) PC or a powerful DSP as the software arithmetic logic unit 10, a plurality of camera cores 15 can also be connected to a single software arithmetic logic unit 10.

By separating the real-time camera core 15 and the software arithmetic logic unit 2 not subject to real-time requirements, modular camera systems can be developed, the real-time capabilities of which do not differ in relation to the image-capture prompt, regardless of how powerful the software arithmetic logic unit 2 is. This enables a particularly flexible configuration of a smart camera 1.

Figure 2:
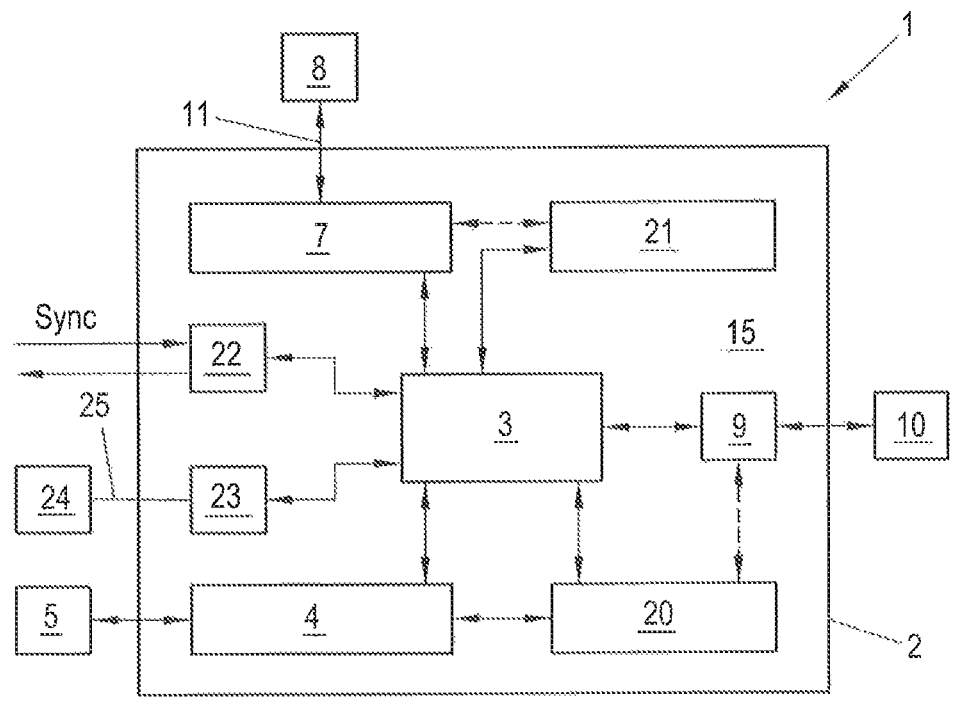
FIG. 2 shows a further embodiment of a smart camera according to the invention comprising a camera core.

In addition, further functions of a smart camera 1 can also be implemented in hardware, i.e. as a digital circuit, in the camera core 15, as explained on the basis of FIG. 2. The additional functionalities described below can of course be implemented independently of other additional functionalities and in any combination. The advantage of the implementation in hardware within the camera core 15 is again that the additional functions can be carried out concurrently.

Via an illumination interface 23, for example, an external illumination unit 24 can be connected to the real-time camera core 15 via a suitable illumination connection 25. This makes it possible to control the illumination unit 24 via the camera control unit 3, for example in the form of a flash synchronised with the capture of an image.

Alternatively, an illumination unit 24 can itself be a real-time component that can be connected directly to the real-time data bus 11 and that, for example, is controlled by a control unit 8 on the real-time data bus 11.

Via a general I/O interface 22, any additional external devices or functions can be connected or synchronised. For example, via the I/O interface 22, an external trigger input Sync can be implemented to synchronise the smart camera 1 with an external function not implemented via the real-time data bus interface 7, for example. Likewise, via the I/O interface 22, an external component can also be synchronised from the smart camera 1. Since external components not integrated via the real-time data bus interface 7 usually suffer from a jitter that cannot be fully corrected, the performance of the entire system in such cases is lower than when using a solution that is integrated in full via the real-time data bus interface 7 (which is thus more advantageous).

In the camera core 15, an image processing unit 20 can also be provided, in which the image sensor 5 can carry out a particular (pre-)processing of the image data. It goes without saying that the image processing unit 20 could also be implemented in the camera control unit 3 or image sensor interface 4. The (pre-)processed image data can be forwarded to the software arithmetic logic unit 10 by the image processing unit 20 via the camera control unit 3 and the data interface 9, or even directly via the data interface 9, as shown in dashed lines in FIG. 2. In the software arithmetic logic unit 10, the image data or the (pre-)processed image data can be processed further. After the image data has been processed further in the software arithmetic logic unit 10, said data can also be transmitted back to the camera core 15, for example to be stored therein or output via the data bus interface 17.

In the camera core 15, a memory unit 21 can also be implemented for storing image data from the image sensor 5, (pre-)processed image data and/or image data processed further in the software arithmetic logic unit 10, for example to then be output via the real-time data bus interface 7. As a memory module, for example an SD-RAM or DDR3, the memory unit 21 could also be linked to the camera core 15. For this purpose, a memory control unit to which the memory module is connected can be implemented in the camera core 15. The memory control unit would then be connected to, and controlled by, the camera control unit 3. Likewise, the software arithmetic logic unit 10 can of course also comprise a memory unit, as is known.

The result, in the form of an output signal, of the processing in the smart camera 1 of the image data captured by the image sensor 5 can also be sent to other components connected to the smart camera 1 via the real-time data bus 11, for example a closed-loop or open-loop control assembly, via the real-time data bus interface 7. Alternatively, however, the result could also be sent via a data bus interface 17, for example so as to not put strain on the bandwidth of the real-time data bus 11. However, it would also be conceivable for the software arithmetic logic unit 10 to have a separate data bus interface, via which the result determined in the software arithmetic logic unit 10 is sent, for example via a linked non-real-time data bus 14. The result of the processing is usually not available in real time, so it is no problem to not send said result via the real-time data bus 11. If, however, the result can be provided by the camera core 15 in the predefined real-time step, i.e. in real time, the result can also be sent in real time via the real-time data bus 11. In that case, it would be possible to not only prompt the capture of an image in real time, but also to provide the result of the processing of the input image data. By way of example, the result could be information on an orientation of a captured object, it could be the type of object, or it could highlight a faulty workpiece. It goes without saying that there are no restrictions on the image data processing possibilities in this case. In addition, image data can also be forwarded via the real-time data bus 11 or the non-real-time data bus 14, although usually this is not necessary or desired.

The precise sequence of reading in the image (inputting the image data from the image sensor 5) after prompting the capture of an image, the duration of any intended exposition, HDR (high dynamic range) or multi-captures, etc., are part of the configuration of the smart camera 1 that is usually carried out before the smart camera 1 is used. For this purpose, for example, configuration parameters can be set in a memory unit 21 or the software arithmetic logic unit 10 can be programmed. To do so, the data bus interface 17 can be used, for example. The configuration can also be done when devising the digital circuit of the hardware arithmetic logic unit 2, for example of the image processing unit 20. The camera core 15 then synchronously handles the further intended image processing in the smart camera 1.

The camera core 15 ensures the real-time capability of the image capturing, i.e., the prompting to capture an image, and possibly of the illumination. Due to the volume of data and the often complex processing of the image data, everything else such as the reading out of the image from the image sensor 5, the pre-processing (e.g. in the image processing unit 20) and/or further processing (e.g. in the software arithmetic logic unit 10) of the read-out image data is usually not real time capable (i.e. cannot be carried out in a real-time cycle). In many applications, the result of the processing of the read-out image data must be available in the camera core 15 only as promptly as possible or sufficiently promptly, which is determined by the performance overall, the software arithmetic logic unit 10, the data interface 9, the image processing unit 20, etc. However, if the processing of the read-out image data in the smart camera 1, for example in the software arithmetic logic unit 10, the image processing unit 20 and/or the camera control unit 3, is completed within a sufficiently short time frame (within a defined real-time cycle), real-time capabilities can then also be ensured for the smart camera 1 outputting the output signal. The real-time camera core 15 according to the invention therefore also makes it possible for the smart camera 1 to be scaled to the requirements and the application in a simple manner, for example by linking various software arithmetic logic units 10 or configuring an image processing unit 20.

The smart camera 1 according to the invention could be used in an industrial image processing application (machine vision application), as explained by way of example of the basis of FIG. 3. A machine or system 13 (or a particular function thereof, for example a drive shaft) is controlled by a control unit 8 (e.g. a servo amplifier of the drive shaft) in real time. For this purpose, the machine or system 13 and the control unit 8 are interconnected via a real-time data bus 11, for example POWERLINK. For the control, the control unit 8 receives feedback from the machine or system 13 via a smart camera 1. For example, the machine 13 could be a printing press and the smart camera 1 could be used to analyse a printed notch, and this is used in the control unit 8 to automatically control a printing unit in the printing press. The smart camera 1 is connected to the control unit 8 via the real-time data bus 11. Via the real-time data bus 11, the control unit 8 can, in real-time, control the capture of an image by the smart camera 1. It goes without saying that a plurality of smart cameras 1 can also be used in the process, as shown in FIG. 3, in which case the capture of an image by a further smart camera 1 can also be triggered by a different smart camera 1 (fear example again via a synchronisation data packet sent via the real-time data bus 11). Via the image sensor interface 4, the camera control unit 3 in the camera core 15 prompts the triggering of the image sensor 5 to capture an image on the basis of a synchronisation data packet, received via the real-time data bus interface 7, of an external component connected to the smart camera 1 via the real-time data bus 11, for example the control unit 8 or another real-time smart camera. The trigger for an image to be captured can also come from outside (e.g. via the trigger input Sync), although in this case real time could no longer be reliably guaranteed. Preferably, therefore, the capture of an image is prompted via the real-time data bus 11, for example via a real-time data communication received via the real-time data bus 11. As the capture of an image is prompted, the image data are input and processed by the camera core 15.

Figure 4:
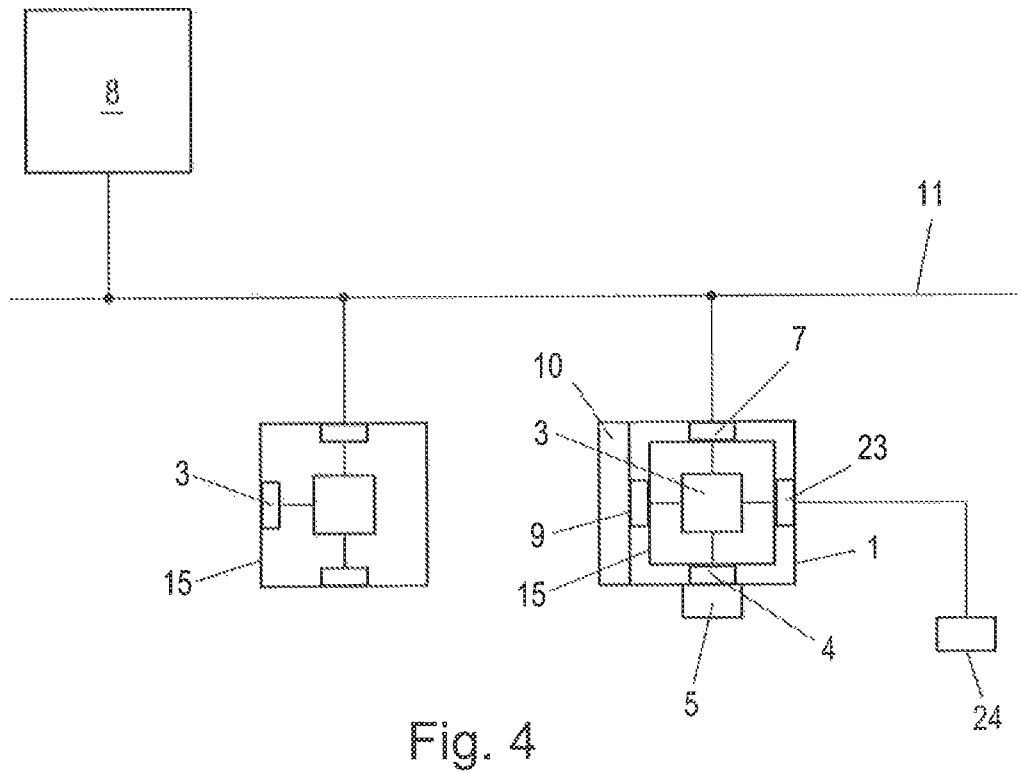

However, a camera core 15 alone can also be used on the real-time data bus 11, i.e. without an image sensor 5, in order to trigger in real time a smart camera 1 (or a plurality of smart cameras) connected to the camera core 15 via the real-time data bus 11, as shown in FIG. 4. In this case, for example, the camera core 15 would receive the image-capture command from the control unit 8, and the camera core 15 would implement this command via the connected smart camera 1, which thus acts as an external image sensor.

The input image data from the image sensor 5 can be delivered to the image processing unit 20 for preprocessing or stored temporarily in the memory unit 21, for example via the camera control unit 3 or directly by the image sensor interface 4. Image data can also be processed in the camera control unit 3 directly when the image is read in, concurrently and without any further delay and/or processed in an image processing unit 20. For example, this may be a correction to the image data on the basis of stored calibration data in order to compensate for imaging errors in the optical system. However, the input image data could also be filtered, the contrast altered, the location/orientation/position of a particular object determined, a particular object or a feature of an object identified, a measurement carried out on the captured object, etc. In this respect, a wide range of possibilities are of course conceivable for processing the input image data. The input and/or processed image data can also be stored in the memory unit 21. The result of this pre-processing now does not have to be image data, but rather the result can be a desired output signal or a combination of the two. The pre-processed or input image data can then be delivered to the software arithmetic logic unit 10 by the camera control unit 3 in order to carry out any necessary further processing of the image data. This further processing is therefore prompted by the hardware arithmetic logic unit 2. Again, the result of this further processing now does not have to be image data, but rather the result can be a desired output signal or a combination of the two. The output signal and/or processed image data are sent back to the camera control unit 3 and/or to the memory unit 21 by the software arithmetic logic unit 10. When the implemented image processing is complete, the camera control unit 3 prompts the sending of the output signal and/or of processed image data. In the process, the output signal or image data can be output via the data bus interface 17 and the non-real-time data bus 14 or via the real-time data bus interface 7 and the real-time data bus 11. By way of example, the output signal can be sent to the external control unit 8, which can control a function of a machine or system 13 on the basis of the output signal. It goes without saying that image data or processed image data could also be sent via the non-real-time data bus 14 or the real-time data bus 11 when required for an application.

The invention claimed is:

1. A camera core of a smart camera for industrial image processing being designed as a hardware arithmetic logic unit comprising:
    an image sensor interface configured for connecting the camera core to an image sensor for capturing an image;
    a real-time data bus interface configured for connecting the camera core to a real-time data bus; and
    a camera control unit connected to both the real-time data bus interface and the image sensor interface,
    wherein the camera control unit is actuated via the real-time data bus interface to prompt the capture of an image, and the camera control unit controls the image sensor interface.

2. The camera core according to claim 1, wherein the hardware arithmetic logic unit further comprises a data interface for connecting a software arithmetic logic unit to the camera core, the data interface being connected to the camera control unit, and the camera control unit controlling the data interface.

3. The camera core according to claim 1, wherein the hardware arithmetic logic unit further comprises a data bus interface for connecting a non-real-time data bus to the camera core, the data bus interface being connected to the camera control unit, and the camera control unit controlling the data bus interface.

4. The camera core according to claim 1, wherein the hardware arithmetic logic unit further comprises an illumination interface for connecting an illumination unit to the camera core, and the camera control unit controls the illumination interface.

5. The camera core according to claim 1, wherein the hardware arithmetic logic unit further comprising an I/O interface, and the camera control unit controls the I/O interface.

6. The camera core according to claim 1, wherein the hardware arithmetic logic unit further comprises an image processing unit for processing image data, and the camera control unit controls the image processing unit.

7. The camera core according to claim 1, wherein the camera control unit is provided for processing image data.

8. A smart camera comprising the camera core according to claim 1, wherein an image sensor is connected to the image sensor interface and the image sensor interface is actuated to prompt the image sensor to capture an image when a synchronisation data packet is received via a real-time data bus connected to the real-time data bus interface.

9. The smart camera according to claim 8, further comprising an illumination unit connected to the illumination interface.

10. The smart camera according to claim 8, wherein the camera control unit prompts the capture of an image and/or activates the illumination unit when the camera control unit receives a trigger signal via a trigger input connected to the I/O interface.

11. The smart camera according to claim 8, further comprising a software arithmetic logic unit, which receives and processes image data from the camera core, being connected to the data interface.

12. A method for the industrial image processing of image data captured by a smart camera having a camera core with an image sensor interface and a real-time data bus interface, to which an image sensor is connected to the image sensor interface of the camera core and a real-time data bus is connected to the real-time data bus interface of the camera core, comprising:

receiving, via the real-time data bus interface of the camera core, a synchronization data packet from the real-time data bus;

controlling a prompt for the image sensor to capture an image when the synchronization data packet is received via the real-time data bus interface.

13. The method according to claim 12, wherein image data are processed in a camera control unit.

14. The method according to claim 12, wherein the camera core includes an image processing unit and a control unit, and wherein the image data are processed in the image processing unit, which is connected to the control unit.

15. The method according to claim 12, wherein the camera core includes a data interface, and wherein a software arithmetic logic unit is connected to the data interface of the camera core, and the method further comprising sending the image data from the camera core to the software arithmetic logic unit and processing the image data in the software arithmetic logic unit.

16. The method according to claim 13, further comprising, as a result of the processing, generating an output signal, which is output via the real-time data bus interface or via a data bus interface in the camera core.

17. The method according to claim 16, wherein the output of the output signal is controlled by the camera control unit.

18. A camera core of a smart camera for industrial image processing being designed as a hardware arithmetic logic unit comprising:

an image sensor interface configured for connecting the camera core to an image sensor for capturing an image; and a real-time data bus interface configured for connecting the camera core to a real-time data bus, wherein, in response to a signal received via the real-time data bus interface, a prompt is sent through to the image sensor interface to capture an image.

19. The camera core according to claim 18, wherein the hardware arithmetic logic unit further comprises a data interface for connecting a software arithmetic logic unit to the camera core.

20. The camera core according to claim 18, wherein the hardware arithmetic logic unit further comprises a data bus interface for connecting a non-real-time data bus to the camera core.

* * * * *